United States Patent
Hirota et al.

[11] Patent Number: 5,884,476
[45] Date of Patent: Mar. 23, 1999

[54] EXHAUST GAS PURIFYING DEVICE FOR ENGINE

[75] Inventors: Shinya Hirota; Tatsuji Mizuno; Kazuya Kibe, all of Susono, Japan

[73] Assignee: Toyota Jidosha Kabushiki Kaisha, Aichi-ken, Japan

[21] Appl. No.: 925,025

[22] Filed: Sep. 8, 1997

[30] Foreign Application Priority Data

Sep. 9, 1996 [JP] Japan .................................. 8-237938

[51] Int. Cl.⁶ ............................ F02M 25/07; F01N 3/36; F02D 43/00
[52] U.S. Cl. .............................. 60/278; 60/285; 60/286; 60/301
[58] Field of Search ................ 60/278, 284, 285, 60/286, 301

[56] References Cited

U.S. PATENT DOCUMENTS

| | | | |
|---|---|---|---|
| 5,172,550 | 12/1992 | Takeshima | 60/301 X |
| 5,201,173 | 4/1993 | Fujimoto et al. | 60/277 |
| 5,606,856 | 3/1997 | Linder et al. | 60/301 X |
| 5,806,310 | 9/1998 | Daidou et al. | 60/301 X |

FOREIGN PATENT DOCUMENTS

| | | |
|---|---|---|
| 0503882 | 9/1992 | European Pat. Off. . |
| 4-209956 | 7/1992 | Japan . |
| 5-113116 | 5/1993 | Japan . |
| 5-312109 | 11/1993 | Japan . |
| 6-108927 | 4/1994 | Japan . |
| 6-117292 | 4/1994 | Japan . |

OTHER PUBLICATIONS

"Patent Abstracts of Japan", vol. 096, No. 009, abstract of JP–8–12154–A, Sep. 1996.
"Patent Abstracts of Japan", vol. 015, No. 235 (M–1125), abstract of JP–3–074560–A, Jun. 1991.
"Patent Abstracts of Japan", vol. 018, No. 323 (M–1624), abstract of JP–6–074022–A, Jun. 1994.

Primary Examiner—Tony M. Argenbright
Attorney, Agent, or Firm—Kenyon & Kenyon

[57] ABSTRACT

An exhaust gas purifying device, for an engine performing a lean operation and having an EGR system capable of controlling an EGR ratio, comprises a $NO_X$ catalyst arranged in the exhaust passage capable of selectively reducing $NO_X$ in the inflowing exhaust gas, in the oxidizing atmosphere including a reducing agent, and a reducing agent injector arranged in the exhaust passage of the engine for secondarily supplying a reducing agent to the exhaust passage upstream of the $NO_X$ catalyst. The EGR system has an EGR passage connecting the exhaust passage and the intake passage of the engine, an EGR control valve arranged in the EGR passage, and an intake air control valve arranged in the intake passage upstream of an inlet of the EGR passage. The openings of the EGR control valve and the intake air control valve are controlled to control the temperature of the exhaust gas to make the temperature of the $NO_X$ catalyst within the optimum temperature range or equal to the optimum temperature. The amount of the reducing agent injected by the reducing agent injector is made smaller as the EGR ratio becomes higher.

16 Claims, 10 Drawing Sheets

EXHAUST GAS PURIFYING DEVICE FOR ENGINE

BACKGROUND OF THE INVENTION

1. Field of the Invention

The present invention relates to an exhaust gas purifying device for an engine.

2. Description of the Related Art

Japanese Unexamined Patent Publication No. 5-113116 discloses an exhaust gas purifying device for an engine in which a lean engine operation is performed, i.e., an air-fuel ratio is made lean with respect to a stoichiometric air-fuel ratio. The device is provided with a $NO_X$ catalyst arranged in an exhaust passage of the engine capable of selectively reducing $NO_X$ in the inflowing exhaust gas in the oxidizing atmosphere including a reducing agent, and a reducing agent feeding device for secondarily feeding the reducing agent to the exhaust passage upstream of the $NO_X$ catalyst. The exhaust gas of the engine performing the lean operation provides the oxidizing atmosphere including the reducing agent, such as unburned hydrocarbon (HC) and carbon monoxide (CO). Thus, if this exhaust gas is introduced to the $NO_X$ catalyst, a part of $NO_X$ in the exhaust gas is reduced and purified by the unburned HC and CO. However, the amount of the unburned HC and CO in the exhaust gas discharged from the engine is much smaller than that of $NO_X$, and the reducing agent will be insufficient to purify $NO_X$. Therefore, the exhaust gas purifying device mentioned above is provided with the reducing agent supplying device for secondarily feeding the reducing agent to the exhaust passage upstream of the $NO_X$ catalyst, to thereby avoid a shortage of the reducing agent with respect to $NO_X$. Note that the $NO_X$ catalyst comprises a transition metal or a precious metal carried on a carrier, such as zeolite, by an ion changing process.

On the other hand, it is well known that an exhaust gas recirculation (EGR) system in which a part of the exhaust gas is recirculated to an intake passage of the engine as an EGR gas, and the feeding of the EGR gas to the engine, reduces the amount of $NO_X$ discharged from the engine. In this case, an EGR ratio, which is a ratio of the amount of the EGR gas to the sum of the amounts of the EGR gas and the fresh air fed to the engine, can be controlled in accordance with the engine operating condition.

However, the amounts of $NO_X$, unburned HC, and CO will vary in accordance with the variation of the EGR ratio. Accordingly, if the EGR system is applied to the exhaust gas purifying device mentioned above and the reducing agent is simply fed, the reducing agent may be in excess or insufficient with respect to the $NO_X$ to be purified.

SUMMARY OF THE INVENTION

An object of the present invention is to provide an exhaust gas purifying device capable of making the amount of the reducing agent secondarily fed suitable.

According to the present invention, there is provided an exhaust gas purifying device for an engine having a combustion chamber, an intake passage, an exhaust passage, and an exhaust gas recirculation (EGR) system for supplying an EGR gas to the engine, the EGR system being capable of controlling an EGR ratio, the engine performing a lean operation, the device comprising: a $NO_X$ catalyst arranged in the exhaust passage capable of selectively reducing $NO_X$ in the inflowing exhaust gas in an oxidizing atmosphere including a reducing agent; reducing agent supplying means for secondarily supplying a reducing agent to the exhaust passage upstream of the $NO_X$ catalyst or to the combustion chamber; and reducing agent amount control means for controlling the amount of the reducing agent to be supplied by the reducing agent supplying means in accordance with the EGR ratio, wherein $NO_X$ is reduced by the reducing agent on the $NO_X$ catalyst.

The present invention may be more fully understood from the description of the preferred embodiments of the invention as set forth below, together with the accompanying drawings.

DESCRIPTION OF THE PREFERRED EMBODIMENTS

Figure 1:
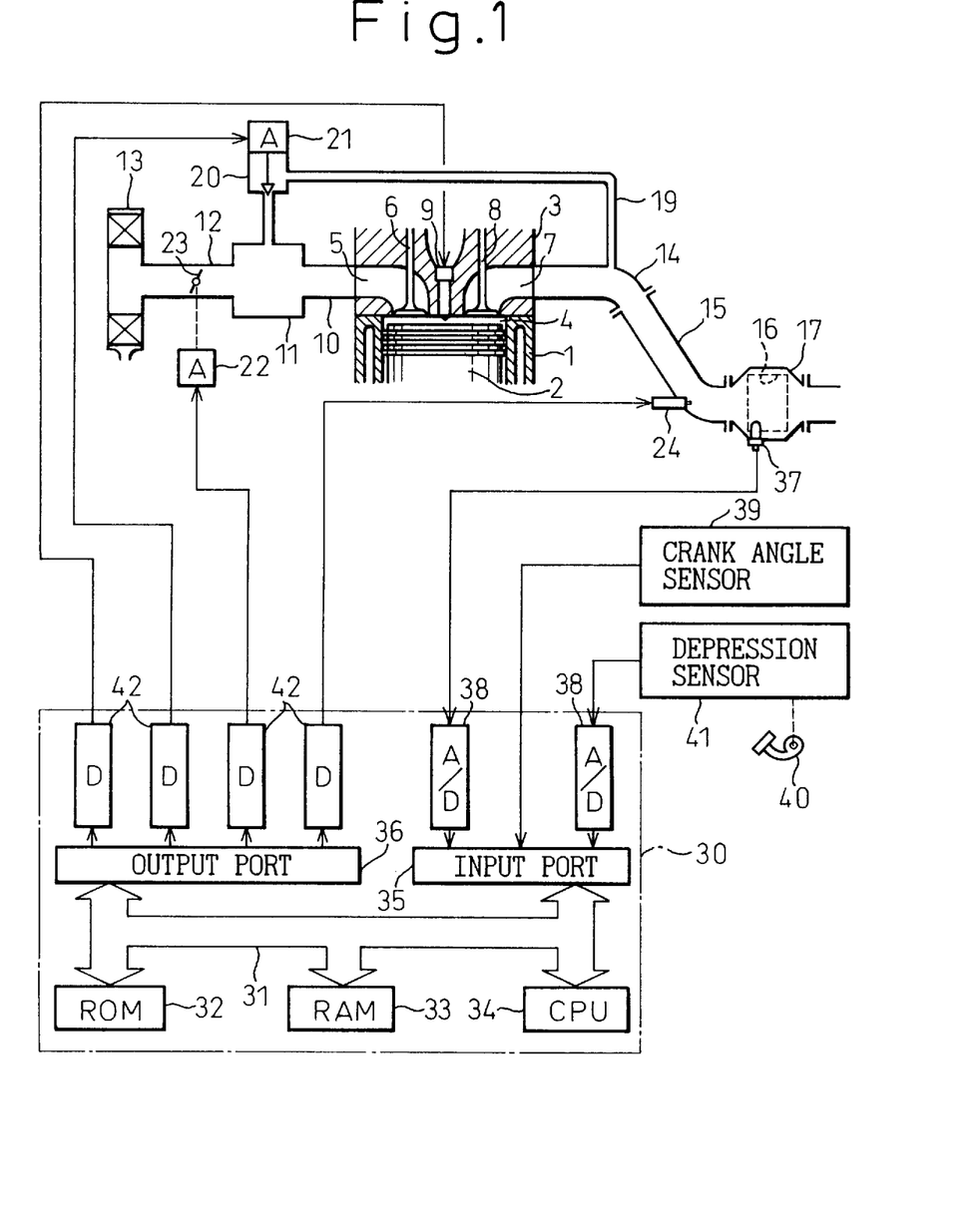
FIG. 1 is a general view of an engine.

FIG. 1 illustrates the present invention applied to a diesel engine. Alternatively, the present invention may be applied to a spark-ignition gasoline engine.

Referring to FIG. 1, a reference numeral 1 designates a cylinder block, 2 designates a piston, 3 designates a cylinder head, 4 designates a combustion chamber, 5 designates an intake port, 6 designates an intake valve, 7 designates an exhaust port, 8 designates an exhaust valve, and 9 designates a fuel injector for injecting fuel directly into the combustion chamber 4. The intake ports 5 of each cylinder are connected to a common surge tank 11 via a corresponding branch 10, and the surge tank 11 is connected to an air cleaner 13 via an intake duct 12. On the other hand, the exhaust ports 7 of each cylinder are connected to a common exhaust manifold 14, and the manifold 14 is connected to a catalytic converter 17 housing a $NO_X$ catalyst 16 therein, via an exhaust pipe 15. Note that the fuel injectors 9 are controlled by output signals from an electronic control unit 30.

As shown in FIG. 1, the correcting portion of the exhaust manifold 14 and the surge tank 11 are connected to each other, via an EGR passage 19. An EGR control valve 20 is arranged in the EGR passage 19 for controlling the amount of the EGR gas flowing through the EGR passage 19, and is controlled by an actuator 21 of, for example, an electromagnetic type. The actuator 21 is controlled by output signals from the electronic control unit 30.

An intake air control valve 23 is arranged in the intake duct 12, i.e., in the intake passage upstream of an inlet of the EGR passage 19, and is controlled by an actuator 22 of, for example, an electromagnetic type. The intake air control valve 23 is usually kept fully open, and is closed slightly when the engine load or the engine speed is very low. The actuator 22 is controlled by output signals from the electronic control unit 30.

When the EGR control valve 20 is opened, the EGR gas is fed to the combustion chamber 4. In this case, the amount of EGR gas becomes larger as the opening of the EGR control valve 20 becomes larger, with the constant engine operating condition and the constant opening of the intake air control valve 23. Also, the amount of the EGR gas becomes larger as the opening of the intake air control valve 23 becomes smaller, with the constant engine operating condition and the constant opening of the EGR control valve 20. Note that, in a diesel engine as shown in FIG. 1, the sum of the amounts of fresh air and the EGR gas sucked into the cylinder is kept almost constant, regardless of the engine operating condition. Accordingly, the amount of the EGR gas is proportional to the EGR ratio, and the following explanation will be made referring to the amount of the EGR gas.

Referring further to FIG. 1, a reducing agent injector 24 is arranged in the exhaust pipe 15 for secondarily feeding the reducing agent to the exhaust pipe 15. A hydrocarbon such as gasoline, isooctane, hexane, heptane, gas oil, and kerosine or a hydrocarbon which can be stored in a liquid form, such as butane or propane, can be used as the reducing agent. However, the diesel engine shown in FIG. 1 uses fuel of the engine to be injected from the fuel injector 9, as the reducing agent. Thus, there is no need to provide an additional tank for the reducing agent. Note that the reducing agent injector 24 is controlled by output signals from the electronic control unit 30.

The electronic control unit (ECU) 30 is constructed as a digital computer and comprises a read-only memory (ROM) 32, a random-access memory (RAM) 33, the CPU (micro processor) 34, an input port 35, and an output port 36. ROM 32, RAM 33, CPU 34, the input port 35, and the output port 36 are interconnected with each other via a bidirectional bus 31. A temperature sensor 37 is arranged in the $NO_X$ catalyst 16, and generates an output voltage in proportion to the temperature TCAT of the $NO_X$ catalyst 16. The output voltage of the sensor 37 is input to the input port 35 via an AD converter 38. The input port 35 is also connected to a crank angle sensor 39, which generates a pulse whenever the crankshaft is turned by, for example, 30 degrees. According to these pulses, the CPU 34 calculates the engine speed N. A depression sensor 41 is connected to an acceleration pedal 40, and generates an output voltage in proportion to an depression DEP of the acceleration pedal 40. The output voltage of the sensor 41 is input to the input port 35 via an AD converter 38. The output port 36 is connected to the fuel injectors 9, the actuators 21 and 22, and the reducing agent injector 24, via corresponding drive circuits 42.

The $NO_X$ catalyst 16 comprises a transition metal, such as copper Cu and iron Fe, or a precious metal, such as platinum Pt and palladium Pd, carried on a carrier, such as zeolite, by an ion changing process. In the oxidizing atmosphere including the reducing agent, such as the unburned HC and CO, the $NO_X$ catalyst 16 can selectively react $NO_X$ in the inflowing exhaust gas with the unburned HC and CO, to thereby reduce the $NO_X$ to nitrogen. Namely, the $NO_X$ catalyst 16 can reduce $NO_X$ in the inflowing exhaust gas, even in the oxidizing atmosphere, if the inflowing exhaust gas includes the reducing agent.

Figure 2:
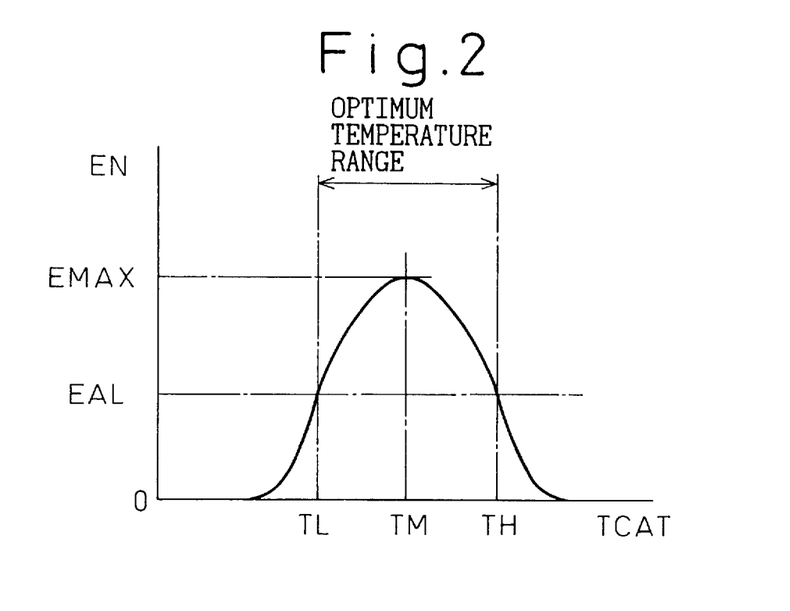
FIG. 2 is a diagram illustrating a purification efficiency of a $NO_X$ catalyst.

FIG. 2 shows a $NO_X$ purification efficiency EN of the $NO_X$ catalyst 16. As can be seen from FIG. 2, the efficiency EN depends on the catalyst temperature TCAT, i.e., the efficiency EN is larger than a minimum acceptable efficiency EAL, when the catalyst temperature TCAT is higher than or equal to a lower threshold TL and is lower than or equal to a higher threshold TH. In other words, if a temperature range between the lower and the higher thresholds is referred to as an optimum temperature range, the $NO_X$ catalyst 16 purifies $NO_X$ in the inflowing exhaust gas sufficiently, when the catalyst temperature is within the optimum temperature range. Note that the catalyst temperature TM provides the maximum efficiency EMAX, as shown in FIG. 2, and is referred to as an optimum temperature, hereinafter.

Next, the control of the opening of the EGR control valve 20 will be explained.

Figure 3:
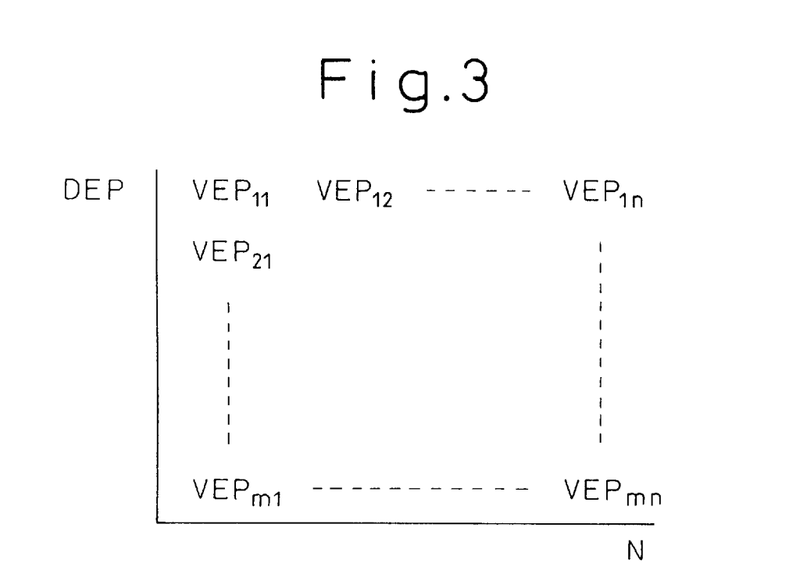
FIG. 3 is a diagram illustrating a basic opening of an EGR control valve.

In the diesel engine shown in FIG. 1, the opening VE of the EGR control valve 20 is calculated based on the following equation:

$$VE = VEP \cdot KE$$

where VEP and KE represent a basic opening of the EGR control valve, and a correction coefficiency for the opening of the EGR control valve 20, respectively. The basic opening VEP is an opening of the EGR control valve 20 required for making the amount of the EGR gas suitable for reducing the amount of $NO_X$ discharged from the engine as small as possible, for increasing the output torque of the engine as much as possible, and for suppressing the fluctuation in the output torque as much as possible. The basic opening VEP is obtained in advance by experiment, and is stored in the ROM 32 in advance in the form of a map as shown in FIG. 3, as a function of the depression DEP of the acceleration pedal 40 and the engine speed N.

The correction coefficient KE for the opening of the EGR control valve 20 is for feedback controlling the opening VE of the EGR control valve 20, on the basis of the output signals of the temperature sensor 37, to make the catalyst temperature TCAT within the optimum temperature range or equal to the optimum temperature TM. Namely, as can be seen from FIG. 4 in which the relationships between the opening VE of the EGR control valve 20 and the temperature TEG of the exhaust gas flowing to the $NO_X$ catalyst 16, with the constant engine operating condition and the constant opening VA of the intake air control valve 23, the exhaust gas temperature TEG becomes higher as the opening VE becomes larger and the amount of the EGR gas becomes larger. This is because the amount of the fresh air becomes smaller as the amount of the EGR gas becomes larger, and the temperature of the fresh air is relatively low and the specific heat of air is relatively large. On the other hand, as explained with reference to FIG. 2, the $NO_X$ catalyst 16 purifies $NO_X$ sufficiently when the catalyst temperature TCAT is within the optimum temperature range, and more sufficiently when TCAT is the optimum temperature TM. Thus, in the embodiment, the exhaust gas temperature TEG is controlled by controlling the opening VE of the EGR control valve 20 to control the amount of the EGR gas, to thereby make the catalyst temperature TCAT within the optimum temperature range or equal to the optimum temperature TM. This ensures good purification of the $NO_X$.

Figure 5:
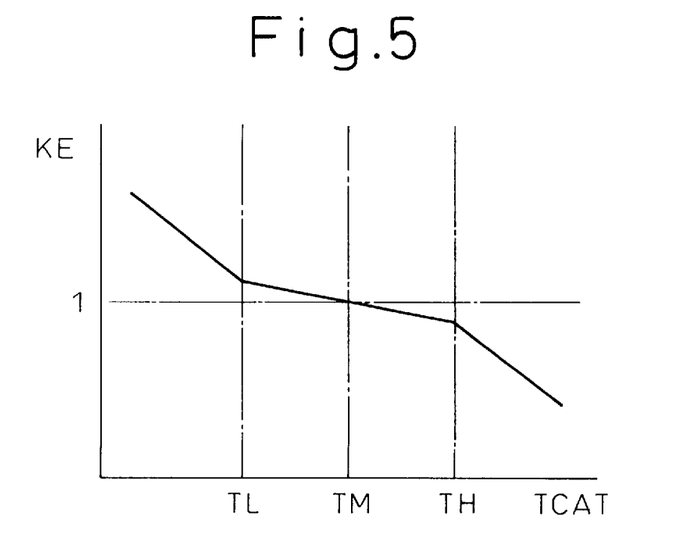
FIG. 5 is a diagram illustrating a correction coefficient for the opening of the EGR control valve.

As shown in FIG. 5, the correction coefficient KE for the opening of the EGR control valve 20 is made equal to 1 when the catalyst temperature is TCAT equal to the optimum temperature TM, and becomes larger as TCAT becomes smaller with respect to TM, and becomes smaller as TCAT becomes larger with respect to TM. Further, the absolute value of the slope of the correction coefficient KE becomes larger when the catalyst temperature TCAT is outside of the optimum temperature range. When the catalyst temperature TCAT becomes lower than the optimum temperature TM, the correction coefficient KE is made larger than 1, and thereby the opening VE of the EGR control valve 20 is made larger and the amount of the EGR gas is made larger. Accordingly, the catalyst temperature TCAT rises toward the optimum temperature TM. When the catalyst temperature TCAT becomes higher than the optimum temperature TM, the correction coefficient KE is made smaller than 1, and thereby the opening VE is made smaller and the amount of the EGR gas is made smaller. Accordingly, the catalyst temperature TCAT drops toward the optimum temperature TM.

Note that, in the present embodiment, the EGR gas feeding operation is performed when an EGR condition is established. The EGR condition is judged not to be established when, for example, the engine operation is in the starting operation, in the warm-up operation, in the acceleration operation, or in the idling operation, and is judged to be established when these operations are not in process.

Next, the control of the intake air control valve will be explained.

Figure 6:
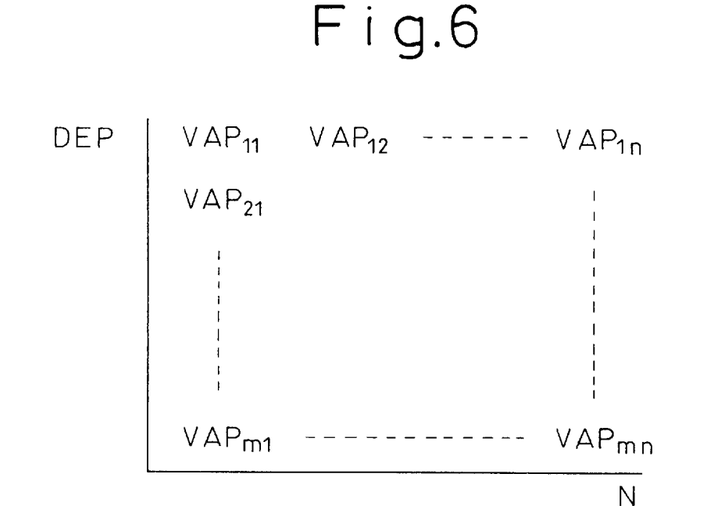
FIG. 6 is a diagram illustrating a basic opening of an intake air control valve.

In the diesel engine shown in FIG. 1, the opening VA of the intake air control valve 23 is calculated based on the following equation:

$$VA = VAP \cdot KA$$

where VAP and KA represent a basic opening of the intake air control valve 23, and a correction coefficient for the opening of the intake air control valve 23, respectively. The basic opening VAP of the intake air control valve 23 is an opening of the intake air control valve 23 suitable for obtaining a larger output torque, while preventing an excess air from being fed into the combustion chamber 4 when the engine load or engine speed is low. The basic opening VAP of the intake air control valve 23 is obtained in advance by experiments, and is stored in the ROM 32 in advance in the form of a map as shown in FIG. 6, as a function of the depression DEP of the acceleration pedal 40 and the engine speed N.

Figure 7:
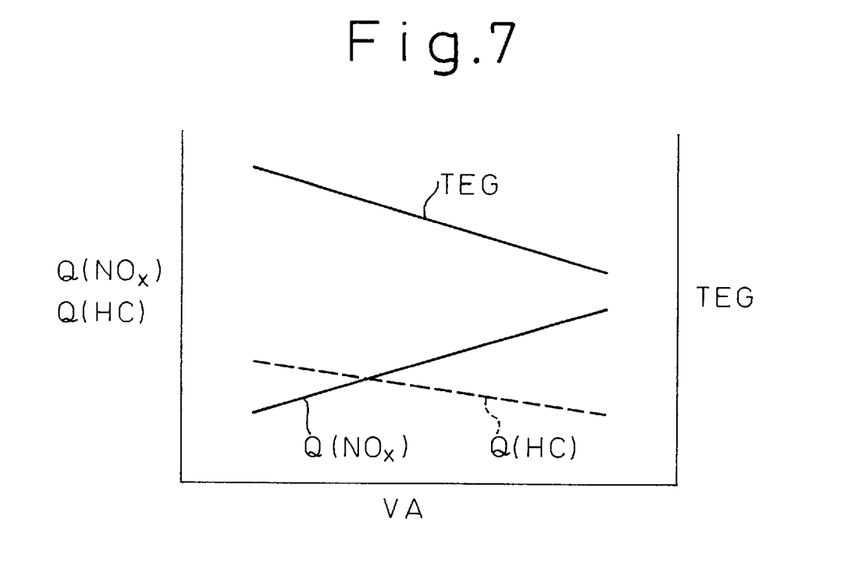
FIG. 7 is a diagram illustrating relationships between the opening of the intake air control valve and the amount of the discharged $NO_X$, the amount of the discharged unburned HC, and the temperature of the exhaust gas.

The correction coefficient KA for the opening of the intake air control valve 23 is for feedback controlling the opening VA of the intake air control valve 23, on the basis of the output signals of the temperature sensor 37, to make the catalyst temperature TCAT within the optimum temperature range or equal to the optimum temperature TM. Namely, as can be seen from FIG. 7 showing relationships between the opening VA of the intake air control valve 23 and the exhaust gas temperature TEG, with the constant engine operating condition and the constant opening VE of the EGR control valve 20, the exhaust gas temperature TEG becomes higher as the opening VA becomes smaller and the amount of the EGR gas becomes larger. Thus, in the embodiment, the exhaust gas temperature TEG is controlled by controlling the opening VA of the intake air control valve 23 to control the amount of the EGR gas, to thereby make the catalyst temperature TCAT be within the optimum temperature range or be equal to the optimum temperature TM. This also ensures the good purification of $NO_X$.

Figure 8:
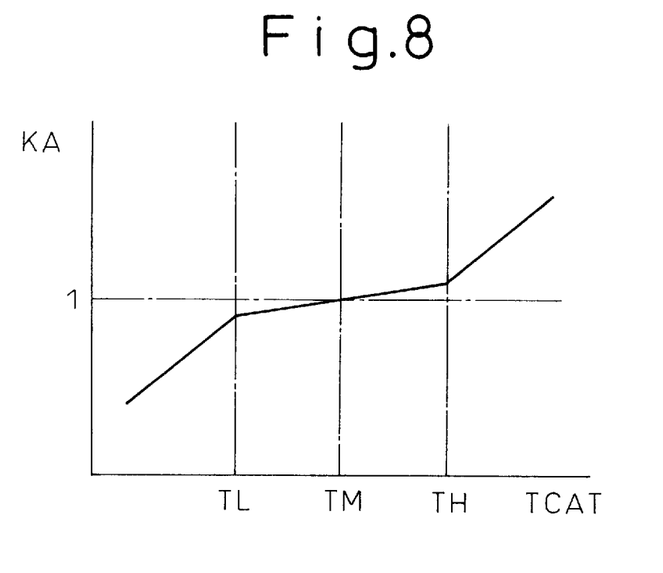
FIG. 8 is a diagram illustrating a correction coefficient for the opening of the intake air control valve.

As shown in FIG. 8, the correction coefficient KA for the opening of the intake air control valve 23 is made equal to 1 when the catalyst temperature TCAT equals to the optimum temperature TM, and becomes smaller as TCAT becomes smaller with respect to TM, and becomes larger as TCAT becomes larger with respect to TM. Further, the absolute value of the slope of the correction coefficient KA becomes larger when the catalyst temperature TCAT is outside the optimum temperature range. When the catalyst temperature TCAT becomes lower than the optimum temperature TM, the correction coefficient KA is made smaller than 1, and thereby the opening VA of the intake air control valve 23 is made smaller and the amount of the EGR gas is made larger. Accordingly, the catalyst temperature TCAT rises toward the optimum temperature TM. When the catalyst temperature TCAT becomes higher than the optimum temperature TM, the correction coefficient KA is made larger than 1, and thereby the opening VA is made larger and the amount of the EGR gas is made smaller. Accordingly, the catalyst temperature TCAT drops toward the optimum temperature TM.

On the other hand, if the diesel engine performs a rich operation in which the air-fuel ratio is made rich with respect to the stoichiometric air-fuel ratio, undesired smoke and particulates will be discharged from the diesel engine. Thus, the diesel engine shown in FIG. 1 usually performs the lean operation. As a result, the exhaust gas discharged from each cylinder is in the oxidizing atmosphere.

Then, the exhaust gas flows into the $NO_X$ catalyst 16. A part of $NO_X$ in the exhaust gas is reduced by unburned HC, CO, etc. in the exhaust gas. However, as mentioned at the beginning, the amount of $NO_X$ to be purified is much larger than that of unburned HC and CO discharged from the engine, and the reducing agent will not be able to purify the $NO_X$ sufficiently. Therefore, the reducing agent is secondarily fed to the exhaust pipe 15 from the reducing agent injector 24, to thereby avoid a shortage of the reducing agent with respect to $NO_X$.

Note that, when the catalyst temperature TCAT is outside the optimum temperature range, the $NO_X$ catalyst 16 does not purify $NO_X$ sufficiently, even if the reducing agent is fed, as can be seen from FIG. 2. Namely, the reducing agent will be discharged from the $NO_X$ catalyst 16 without reducing $NO_X$ when the catalyst temperature TCAT is lower than the lower threshold TL, and will be fully oxidized without reducing $NO_X$ when the catalyst temperature TCAT is higher than the higher threshold TH. Therefore, the diesel engine shown in FIG. 1 performs the feeding of the reducing agent when the catalyst temperature TCAT is within the optimum temperature range, and stops feeding the reducing agent when the catalyst temperature TCAT is outside the optimum temperature range.

Next, the control of the amount of the reducing agent will be explained.

Figure 9:
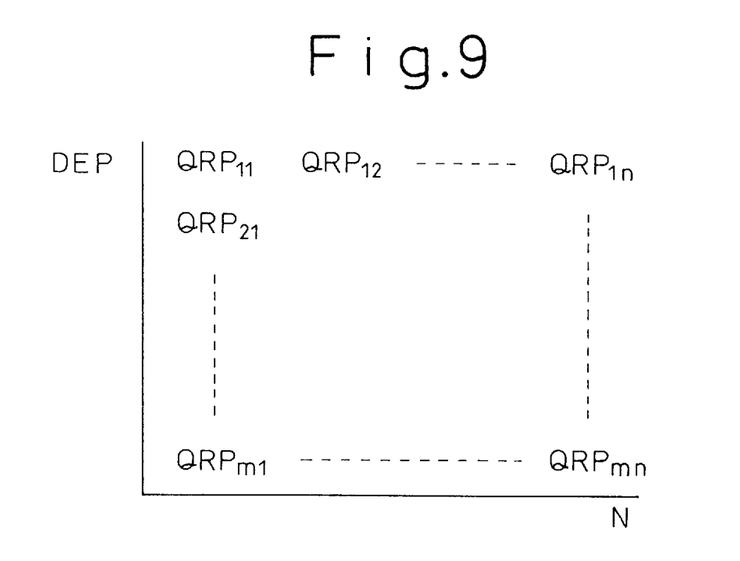
FIG. 9 is a diagram illustrating a basic amount of the reducing agent.

In the diesel engine shown in FIG. 1, the amount QR of the reducing agent to be injected by the reducing agent injector 24 is calculated based on the following equation:

$$QR = QRP \cdot KR$$

where QRP and KR represent a basic amount of the reducing agent and a correction coefficient for the amount of the reducing agent, respectively. The basic amount QRP of the reducing agent is an amount of the reducing agent suitable for purifying the inflowing $NO_X$ sufficiently in the $NO_X$ catalyst 16 with a predetermined reference amount of the EGR gas. While any amount may be used for the reference amount of the EGR gas, the reference amount in the present embodiment is set to an amount of the EGR gas obtained when the opening VE of the EGR control valve 20 is made equal to the basic opening VEP and the opening VA of the intake air control valve 23 is made equal to the basic opening VAP. The basic amount QRP of the reducing agent is obtained, in advance, by experiment and is stored in the ROM 32, in advance and in the form of a map as shown in FIG. 9, as a function of the depression DEP of the acceleration pedal 40 and the engine speed N.

As mentioned above, the opening VE of the EGR control valve 20 or the opening VA of the intake air control valve 23 is corrected to make the catalyst temperature TCAT within the optimum temperature range or equal to the optimum temperature TM, in the diesel engine shown in FIG. 1. Thus, the actual amount of the EGR gas will deviate from the reference amount of the EGR gas, unless both of the correction coefficients KE and KA are made equal to 1. However, the basic amount QRP of the reducing agent is a suitable amount when the amount of the EGR gas is the reference amount, as mentioned above, and thus the reducing agent will be in excess or insufficient if the actual amount of the EGR gas deviates from the reference amount.

Figure 4:
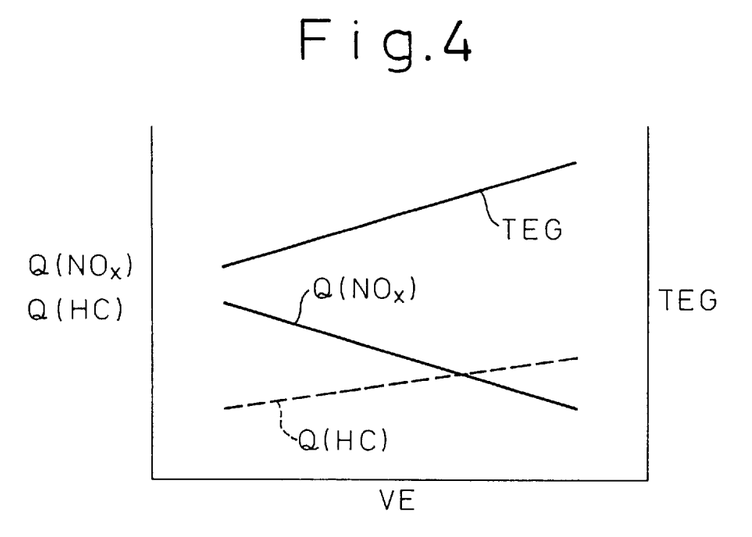
FIG. 4 is a diagram illustrating relationships between the opening of the EGR control valve and the amount of the discharged $NO_X$, the amount of the discharged unburned HC, and the temperature of the exhaust gas.

Namely, as shown in FIG. 4 in which the relationships between the opening VE of the EGR control valve 20 and the amount of $NO_X$ discharged from the engine Q(NOX) and the amount of unburned HC discharged from the engine Q(HC), with the constant engine operating condition and the constant opening VA of the intake air control valve 23, the $NO_X$ amount $Q(NO_X)$ becomes smaller as the opening VE becomes larger and the amount of the EGR gas becomes larger. Contrarily, the HC amount Q(HC) becomes larger as the opening VE becomes larger and the amount of the EGR gas becomes larger. Further, as shown in FIG. 7 in which the relationships between the opening VA of the intake air control valve 23 and the $NO_X$ amount $Q(NO_X)$ and the HC amount Q(HC), with the constant engine operating condition and the constant opening VE of the EGR control valve 20, the $NO_X$ amount $Q(NO_X)$ becomes smaller as the opening VA becomes smaller and the amount of the EGR gas becomes larger. Contrarily, the HC amount Q(HC) becomes larger as the opening VA becomes smaller and the amount of the EGR gas becomes larger.

In other words, with the fed amount of the reducing agent being the basic amount QRP, which is suitable for the reference EGR gas amount, if the amount of the EGR gas is corrected and increases, the reducing agent will be in excess with respect to the $NO_X$ to be purified, and if the amount of the EGR gas is corrected and decreases, the reducing agent will be insufficient with respect to the $NO_X$ to be purified.

Thus, the correction coefficient KR for the amount of the reducing agent is introduced, which coefficient KR decreases the amount of the reducing agent when the amount of the EGR gas is to be increased, and increases the amount of the reducing agent when the amount of the EGR gas is to be decreased, to thereby purify $NO_X$ sufficiently, while preventing the amount of the reducing agent from being in excess or insufficient with respect to $NO_X$. Note that the correction degree for the amount of the reducing agent becomes larger as the correction degree for the amount of the EGR gas becomes larger.

Figure 10A:
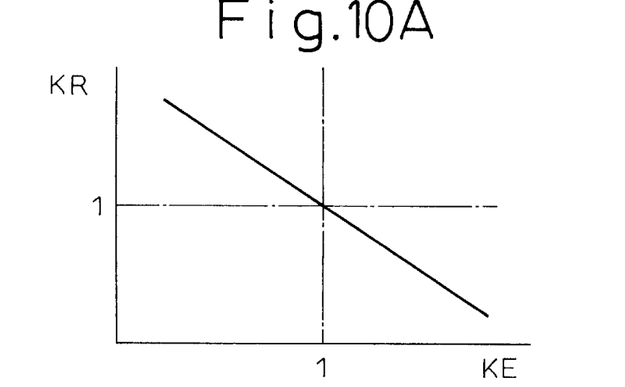
FIGS. 10A through 10C are diagrams illustrating a correction coefficient for the amount of the reducing agent.

The correction coefficient KR for the amount of the reducing agent is made equal to 1 when the correction coefficient KE for the opening of the EGR control valve 20 is made equal to 1, and becomes larger as the correction coefficient KE becomes smaller with respect to 1, and becomes smaller as the correction coefficient KE becomes larger with respect to 1, as shown in FIG. 10A. When the correction coefficient KE for the opening of the EGR control valve 20 becomes smaller than 1 to reduce the amount of the EGR gas and thereby the $NO_X$ amount $Q(NO_X)$ increases and the HC amount Q(HC) decreases, the correction coefficient KR is made larger than 1 and thus a shortage of the reducing agent is prevented. Also, when the correction coefficient KE for the opening of the EGR control valve 20 becomes larger than 1 to increase the amount of the EGR gas and thereby the $NO_X$ amount $Q(NO_X)$ decreases and the HC amount Q(HC) increases, the correction coefficient KR is made smaller than 1 and thus an excess of the reducing agent is prevented.

Figure 10B:
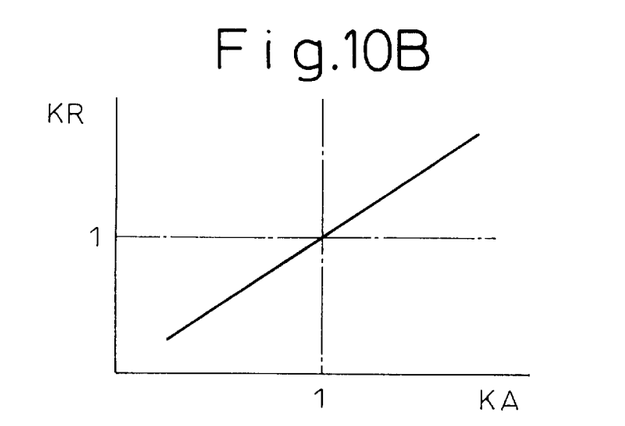
Figure 10C:
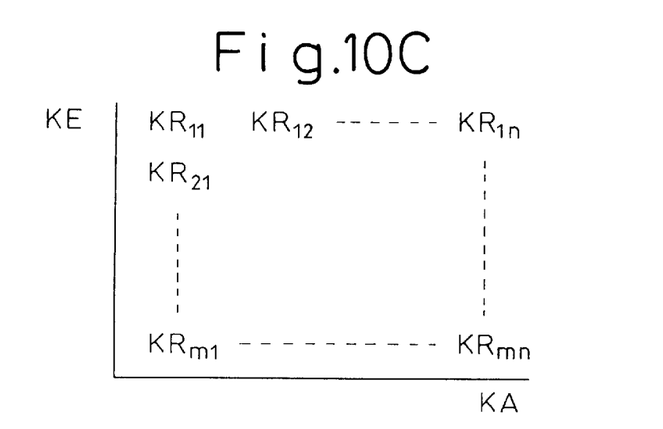

Also, the correction coefficient KR for the amount of the reducing agent is made equal to 1 when the correction coefficient KA for the opening of the intake air control valve 23 is made equal to 1, and becomes smaller as the correction coefficient KA becomes smaller with respect to 1, and becomes larger as the correction coefficient KA becomes larger with respect to 1, as shown in FIG. 10B. When the correction coefficient KA for the opening of the intake air control valve 23 becomes larger than 1 to reduce the amount of the EGR gas and thereby the $NO_X$ amount $Q(NO_X)$ increases and the HC amount Q(HC) decreases, the correction coefficient KR is made larger than 1 and thus the shortage of the reducing agent is prevented. Also, when the correction coefficient KA for the opening of the intake air control valve 23 becomes smaller than 1 to increase the amount of the EGR gas and thereby the $NO_X$ amount $Q(NO_X)$ decreases and the HC amount Q(HC) increases, the correction coefficient KR is made smaller than 1 and thus an excess of the reducing agent is prevented. The correction coefficient KR is stored in the ROM 32 in the form of a map as shown in FIG. 10C.

Note that, when the catalyst temperature TCAT is without of the optimum temperature range, i.e., for example, when the catalyst temperature TCAT is lower than the lower threshold LT, the opening VE of the EGR control valve 20 is made larger, or the opening VA of the intake air control valve 23 is made smaller, as mentioned above. When the opening VE is made larger or the opening VA is made smaller, the $NO_X$ amount $Q(NO_X)$ becomes smaller and the HC amount Q(HC), which can reduce $NO_X$, becomes larger, as explained with reference to FIGS. 4 and 7. Thus, the amount of $NO_X$ discharged from the $NO_X$ catalyst 16 is suppressed when the catalyst temperature TCAT is outside the optimum temperature range.

Figure 11:
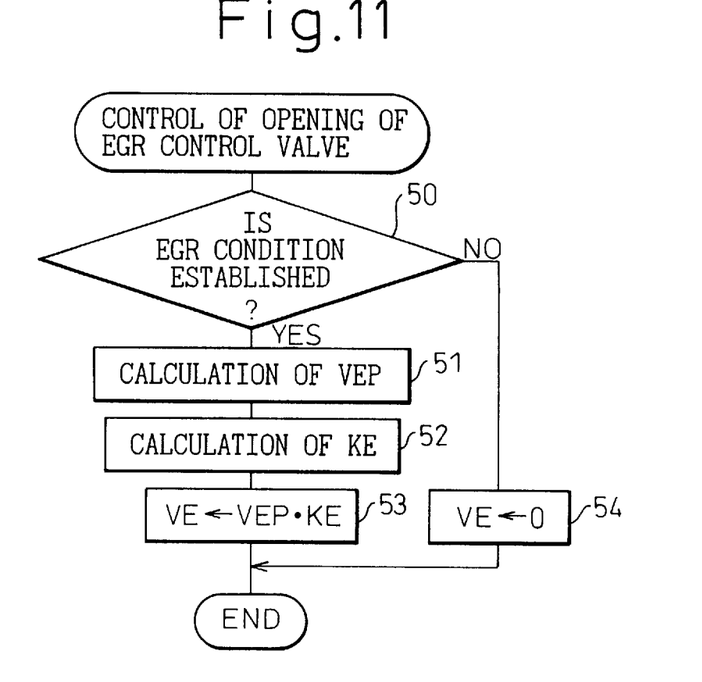
FIG. 11 shows a flowchart for executing control of the opening of the EGR control valve.

FIG. 11 illustrates a routine for executing a control of the opening of the EGR control valve 20. This routine is executed by interruption every predetermined time.

Referring to FIG. 11, first, in step 50, it is judged whether the EGR condition mentioned above is established. If the EGR condition is established, the routine goes to step 51, where the basic opening VEP of the EGR control valve 20 is calculated using the map shown in FIG. 3. In the following step 52, the correction coefficient KE for the opening of the EGR control valve 20 is calculated using the map shown in FIG. 5. In the following step 53, the opening VE of the EGR control valve 20 is calculated based on the following equation:

$$VE = VEP \cdot KE$$

The actuator 21 drives the EGR control valve 20 to make the opening of the EGR control valve 20 equal to VE. Contrarily, if the EGR condition is not established, the routine goes to step 54, where the opening VE of the EGR control valve 20 is made equal to zero, and then the processing cycle is ended. Namely, if the EGR condition is not established, the feeding of the EGR gas is stopped.

Figure 12:
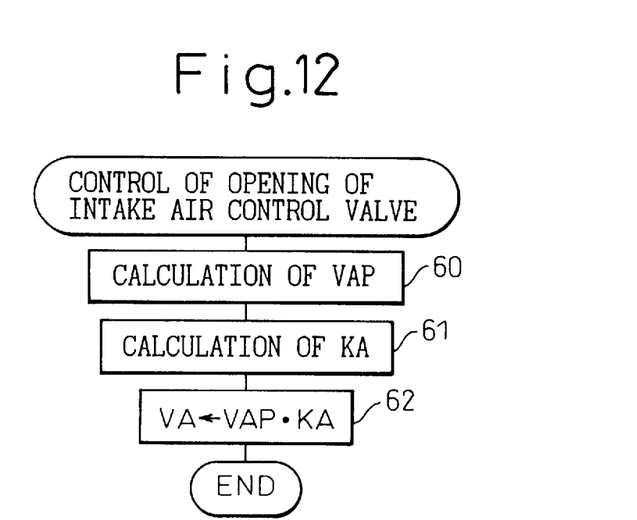
FIG. 12 shows a flowchart for executing control of the opening of the intake air control valve.

FIG. 12 illustrates a routine for executing a control of the opening of the intake air control valve 23. This routine is executed by interruption every predetermined time.

Referring to FIG. 12, first, in step 60, the basic opening VAP of the intake air control valve 23 is calculated using the map shown in FIG. 6. In the following step 61, the correction coefficient KA for the opening of the intake air control valve 23 is calculated using the map shown in FIG. 8. In the following step 62, the opening VA of the intake air control valve 23 is calculated using the following equation:

$$VA = VAP \cdot KA$$

The actuator 23 drives the intake air control valve 23 to make the opening of the intake air control valve 23 equal to VA.

Figure 13:
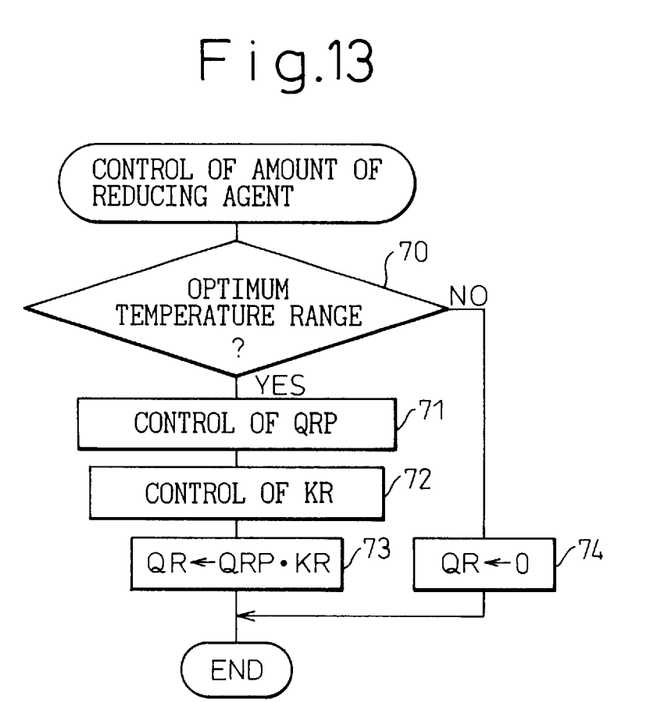
FIG. 13 shows a flowchart for executing control of the amount of the reducing agent.

FIG. 13 illustrates a routine for executing a control of the amount of the reducing agent to be injected by the reducing agent injector 24. This routine is executed by interruption every predetermined time.

Referring to FIG. 13, first, in step 70, it is judged whether the catalyst temperature TCAT is within the optimum temperature range. If the catalyst temperature TCAT is within the optimum temperature range, the routine goes to step 71, where the basic amount QRP of the reducing agent is calculated using the map shown in FIG. 9. In the following step 72, the correction coefficient KR for the amount of the reducing agent is calculated using the map shown in FIG. 10C. In the following step 73, the amount QR of the reducing agent is calculated based on the following equation:

$$QR = QRP \cdot KR$$

The reducing agent injector 24 injects the amount QR of the reducing agent. Contrarily, if the catalyst temperature TCAT is without of the optimum temperature range, the routine goes to step 74, where the amount of the reducing agent QR is made equal to zero, and then the processing cycle is ended. Namely, if the catalyst temperature TCAT is outside of the optimum temperature range, the feeding of the reducing agent from the reducing agent injector 24 is stopped.

Figure 14:
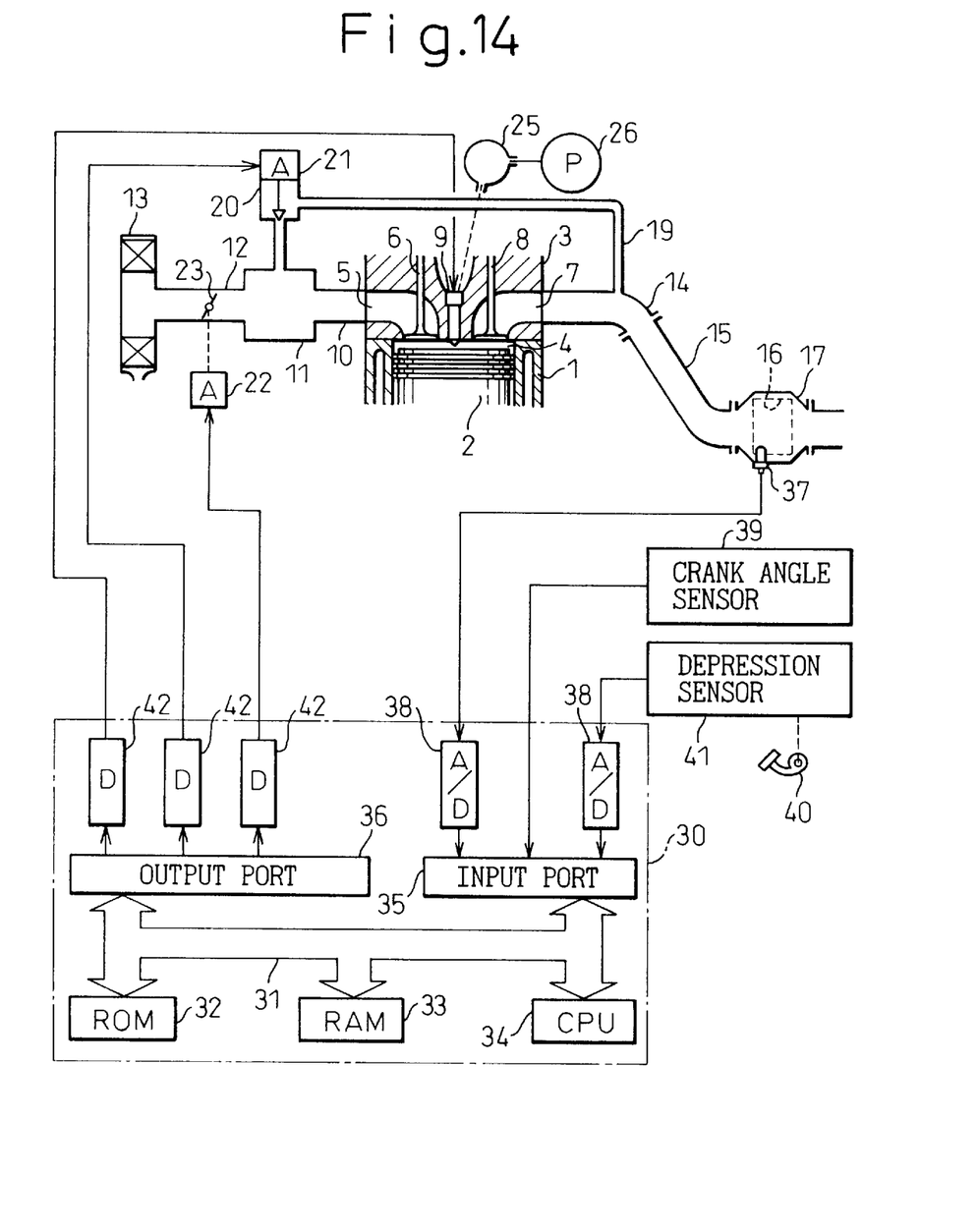
FIG. 14 is a general view of an engine according to another embodiment.

FIG. 14 shows another embodiment of the present invention.

Referring to FIG. 14, the present embodiment differs from the above embodiment in that there is provided a fuel chamber 25 through which fuel pumped up from a fuel pump 26 is distributed to the fuel injectors 9. The fuel chamber 25 allows a plurality of fuel injections in one cycle of the engine.

In the present embodiment, the reducing agent is fed to the $NO_X$ catalyst 16 by the fuel injector 9 in the last half of the combustion stroke or the exhaust stroke of the engine. Namely, when the reducing agent is to be fed, the fuel injection is performed twice in one cycle of the engine, i.e., first, the usual fuel injection is performed at around the top dead center of the compression stroke, and then an additional fuel injection is performed in the last half of the combustion stroke or in the exhaust stroke. When the feeding of the reducing agent is to be stopped, the fuel injection is performed once in one cycle, i.e., the usual fuel injection. Note that fuel injected by the additional fuel injection does not contribute to the engine output. Preferably, the additional fuel injection is performed in the last half of the combustion stroke, in which the temperature of the exhaust gas is relatively high and the fuel (HC) is partly oxidized. In the present embodiment, there is no need to provide a reducing agent injector.

Figure 15:
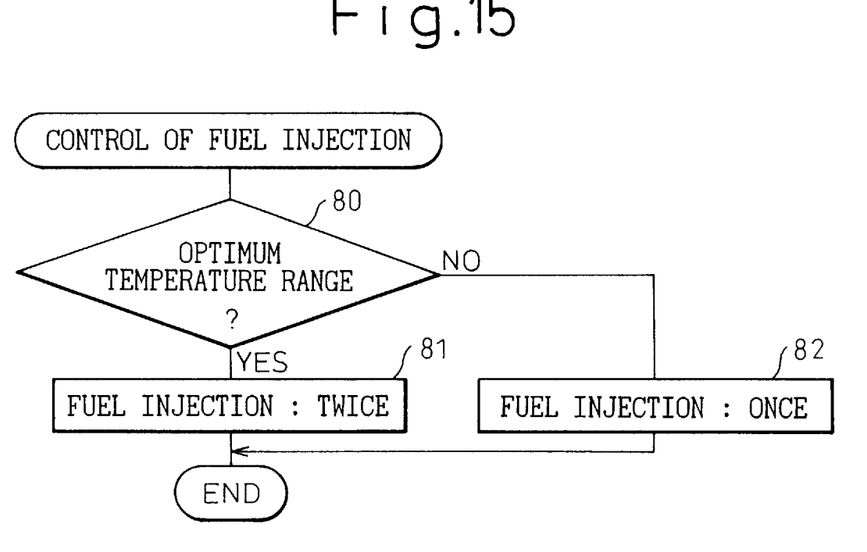
FIG. 15 shows a flowchart for executing control of the fuel injection of a fuel injector.

FIG. 15 illustrates a routine for executing a control of the fuel injection by the fuel injector 9. This routine is executed by interruption every predetermined crank angle.

Referring to FIG. 15, first, in step 80, it is judged whether the catalyst temperature TCAT is within the optimum temperature range. If the catalyst temperature TCAT is within the optimum temperature range, i.e., if the reducing agent is to be fed to the $NO_X$ catalyst 16, the routine goes to step 81, where the fuel injection is performed twice in one cycle of the engine, at around the top dead center of the compression stroke, and in the last half of the combustion stroke or in the exhaust stroke. In this case, the amount of fuel to be fed in the last half of the combustion stroke or in the exhaust stroke is calculated in the routine as shown in FIG. 13. Contrarily, if the catalyst temperature TCAT is outside the optimum temperature range, i.e., if the feeding of the reducing agent is to be stopped, the routine goes to step 82, where the fuel injection is performed once in one cycle, at around the top dead center of the compression stroke. Note that the other structures and operations of the exhaust gas purifying device of the present embodiment are same as those of the above-mentioned embodiment, and thus the explanations thereof are omitted.

In the above embodiments, there is provided a temperature sensor 37 for detecting the catalyst temperature TCAT. However, the catalyst temperature TCAT can be estimated on the basis of the temperature TEG of the exhaust gas flowing to the $NO_X$ catalyst 16, and the exhaust gas temperature TEG can be estimated on the basis of the engine operating condition, for example, the depression DEP of the acceleration pedal 40 and the engine speed N. Thus, the catalyst temperature TCAT may be estimated on the basis of the engine operating condition, alternatively.

According to the present invention, it is possible to provide an exhaust gas purifying device capable of making the amount of the reducing agent, fed secondarily, suitable.

While the invention has been described by reference to specific embodiments chosen for purposes of illustration, it should be apparent that numerous modifications could be made thereto by those skilled in the art without departing from the basic concept and scope of the invention.

We claim:

1. An exhaust gas purifying device for an engine having a combustion chamber, an intake passage, an exhaust passage, and an exhaust gas recirculation (EGR) system for supplying an EGR gas to the engine, the EGR system being capable of controlling an EGR ratio; the engine performing a lean operation, the device comprising:

a $NO_X$ catalyst arranged in the exhaust passage capable of selectively reducing $NO_X$ in the inflowing exhaust gas in an oxidizing atmosphere including a reducing agent;

reducing agent supplying means for secondarily supplying a reducing agent to the exhaust passage upstream of the $NO_X$ catalyst or to the combustion chamber; and reducing agent amount control means for controlling the amount of the reducing agent to be supplied by the reducing agent supplying means in accordance with the EGR ratio, wherein $NO_X$ is reduced, by the reducing agent, on the $NO_X$ catalyst.

2. An exhaust gas purifying device according to claim 1, further comprising detecting means for detecting a temperature of the $NO_X$ catalyst, and EGR ratio control means for feedback controlling the EGR system on the basis of the detected temperature of the $NO_X$ catalyst to control the EGR ratio to control the temperature of the exhaust gas to make the temperature of the $NO_X$ catalyst within a predetermined target temperature range or equal to a predetermined target temperature.

3. An exhaust gas purifying device according to claim 2, wherein the EGR ratio control means comprises basic EGR ratio calculating means for calculating a basic EGR ratio in accordance with the engine operating condition, EGR ratio correcting means for correcting the basic EGR ratio on the basis of the detected temperature of the $NO_X$ catalyst to make the temperature of the $NO_X$ catalyst within the target temperature range or equal to the target temperature, using a feedback correction coefficient, and wherein the reducing agent amount control means comprises reference EGR ratio calculating means for calculating a reference EGR in accordance with the engine operating condition, basic reducing agent amount calculating means for calculating a basic amount of the reducing agent on the basis of the reference EGR ratio, and reducing agent amount correcting means for correcting the basic amount of the reducing agent on the basis of the difference between the reference EGR ratio and the corrected EGR ratio corrected by the EGR ratio correcting means.

4. An exhaust gas purifying device according to claim 3, wherein the reference EGR ratio is the basic EGR ratio, and wherein the reducing agent amount correcting means corrects the basic amount of the reducing agent on the basis of the feedback correction coefficient of the EGR ratio correcting means.

5. An exhaust gas purifying device according to claim 3, wherein the EGR ratio is corrected to be increased when the temperature of the $NO_X$ catalyst is lower than the target temperature range or the target temperature, and is corrected to be decreased when the temperature of the $NO_X$ catalyst is higher than the target temperature range or the target temperature.

6. An exhaust gas purifying device according to claim 5, wherein the amount of the reducing agent to be fed by the reducing agent supplying means becomes smaller as the corrected EGR ratio becomes larger.

7. An exhaust gas purifying device according to claim 2, wherein the $NO_X$ catalyst has a $NO_X$ purification efficiency higher than a minimum acceptable efficiency when the temperature of the $NO_X$ catalyst is within the target temperature range.

8. An exhaust gas purifying device according to claim 2, wherein the $NO_X$ catalyst has a maximum $NO_X$ purification efficiency when the temperature of the $NO_X$ catalyst equals to the target temperature.

9. An exhaust gas purifying device according to claim 1, wherein the EGR system has an EGR passage connecting the exhaust passage and the intake passage to each other, and an EGR control valve arranged in the EGR passage, and wherein the opening of the EGR control valve is controlled to control the EGR ratio.

10. An exhaust gas purifying device according to claim 1, wherein the EGR system has an inlet of the EGR gas arranged in the intake passage, and an intake air control valve arranged in the intake passage upstream of the inlet of the EGR gas, and wherein the opening of the intake air control valve is controlled to control the EGR ratio.

11. An exhaust gas purifying device according to claim 1, wherein the $NO_X$ catalyst comprises a transition metal or a precious metal carried on a carrier.

12. An exhaust gas purifying device according to claim 1, wherein the reducing agent supplying means comprises a reducing agent injector arranged in the exhaust passage upstream of the $NO_X$ catalyst for injecting the reducing agent into the exhaust passage.

13. An exhaust gas purifying device according to claim 1, wherein the reducing agent is the fuel used in the engine.

14. An exhaust gas purifying device according to claim 13, wherein the engine has a fuel injector arranged in the combustion chamber capable of performing a plurality of fuel injections in one cycle of the engine, wherein the reducing agent supplying means controls the fuel injector to inject fuel as the reducing agent in the last half of the combustion stroke or the exhaust stroke of the engine, to supply the reducing agent to the combustion chamber.

15. An exhaust gas purifying device according to claim 1, further comprising determining means for determining whether a $NO_X$ purification efficiency of the $NO_X$ catalyst is higher than a minimum acceptable efficiency, wherein the supplying of the reducing agent is performed when the $NO_X$ purification efficiency of the $NO_X$ catalyst is higher than the minimum acceptable efficiency, and is stopped when the $NO_X$ purification efficiency of the $NO_X$ catalyst is lower than the minimum acceptable efficiency.

16. An exhaust gas purifying device according to claim 1, wherein the amount of the reducing agent to be fed by the reducing agent supplying means becomes smaller as the EGR ratio becomes larger.

\* \* \* \* \*